United States Patent [19]

Pipper et al.

[11] Patent Number: 5,030,709

[45] Date of Patent: Jul. 9, 1991

[54] CONTINUOUS PREPARATION OF COPOLYAMIDES

[75] Inventors: Gunter Pipper, Bad Durkheim; Eckhard M. Koch, Fussgoenheim, both of Fed. Rep. of Germany

[73] Assignee: BASF Aktiengesellschaft, Ludwigshafen, Fed. Rep. of Germany

[21] Appl. No.: 501,034

[22] Filed: Mar. 29, 1990

[30] Foreign Application Priority Data

Apr. 19, 1989 [DE] Fed. Rep. of Germany ....... 3912767

[51] Int. Cl.$^5$ ..................... C08G 69/04; C08G 69/16; C08G 69/28

[52] U.S. Cl. ..................................... 528/324; 526/65; 526/68; 528/323; 528/329.1; 528/335; 528/338; 528/339; 528/340

[58] Field of Search ...................... 528/324, 329.1, 335, 528/338, 339, 340, 323; 526/65, 68

[56] References Cited

U.S. PATENT DOCUMENTS

| | | | |
|---|---|---|---|
| 3,839,121 | 10/1974 | Schmitt et al. | 156/331 |
| 4,566,931 | 1/1986 | Panoch et al. | 156/330.9 |
| 4,719,284 | 1/1988 | Nielinger et al. | 528/335 |

FOREIGN PATENT DOCUMENTS 0160337 11/1985 European Pat. Off. .
0231545 8/1987 European Pat. Off. .

Primary Examiner—Harold D. Anderson
Attorney, Agent, or Firm—Keil & Weinkauf

[57] ABSTRACT

Copolyamides which contain units of the formula $-NH-(CH_2)_4-NH$ are prepared by a continuous process in which a) an aqueous solution of from 5 to 80% by weight of a salt of 1,4-diaminobutane, and dicarboxylic acids and from 20 to 95% by weight of further polyamide-forming starting materials are heated to a temperature above the melting point of the copolyamide, with the addition of diamines and with vaporization of water, under superatmospheric pressure, b) the vapor phase and prepolymer are brought into intimate contact with one another, c) the prepolymer is separated from the vapor phase and the polymer is discharged after a total residence time of not more than 30 minutes, and d) diamines are separated off from the vapor phase and recycled to a).

10 Claims, No Drawings

CONTINUOUS PREPARATION OF COPOLYAMIDES

The present invention relates to a process for continuous preparation of copolyamides which contain units of the formula —NH(CH$_2$)$_4$NH—.

EP-A 231 545 discloses a process for the preparation of copolyamides, in which a mixture of a salt of 1,4-diaminobutane with adipic acid and a salt of 1,4-diaminobutane with terephthalic acid is first heated at 210° C. for 1 hour in the presence of water and the pressure is let down, after which the resulting solid prepolymer is comminuted and then further subjected to solid-phase condensation. This process has the disadvantage that it is time-consuming and eliminated amines are lost.

In another process described in EP-A 210 511, a salt of 1,4-diaminobutane and adipic acid, as an aqueous solution, is condensed in a tube at about 300° C. in a residence time of up to 30 minutes under superatmospheric pressure and the mixture of vapor and prepolymer is let down and the prepolymer is then further subjected to solid-phase condensation.

Furthermore, EP-A 160 337 discloses a process in which an aqueous solution of the salt of 1,4-diaminobutane and terephthalic acid is first precondensed under superatmospheric pressure in an autoclave, and the precondensate is then let down into a heated tube and is discharged from the tube as a liquid melt. The last-mentioned processes likewise have the disadvantage that they require considerable reaction times, the eliminated amines are lost and, as a result of the long residence times in the molten state, damage to the polymer cannot be ruled out.

It is an object of the present invention to provide a process for the continuous preparation of copolyamides which contain units derived from 1,4-diaminobutane, which process takes place in a short time and in which the eliminated amines are recovered, the formation of crosslinked polymers is retarded, byproducts are separated off and discoloration is avoided.

We have found that this object is achieved by a continuous process for the preparation of copolyamides which contain units of the formula —NH(CH$_2$)$_4$—NH—, in which (A) from 5 to 80% by weight of a salt of 1,4-diaminobutane and an equimolar amount of C$_4$–C$_{18}$-dicarboxylic acid and
(B) from 20 to 95% by weight of a lactam having a ring of 6 to 12 carbon atoms, of an aminocarboxylic acid of 6 to 12 carbon atoms or of a salt of C$_4$–C$_{12}$-diamine and an equimolar amount of C$_4$–C$_{18}$-dicarboxylic acid, with the proviso that the dicarboxylic acids of components A and B are not identical, are heated in the presence of water to polyamide-forming temperatures under superatmospheric pressure with formation of a vapor phase and of a polycondensate, and the vapor phase is separated from the polycondensate, wherein (a) an aqueous solution of a mixture of components A and B and in addition from 0.5 to 20 mol % based on the amount of 1,4-diaminobutane, of one or more diamines is passed through an evaporator zone with vaporization of water under from 1 to 10 bar at above the melting point of the copolyamide, and a vapor phase and a precondensate are obtained, (b) the precondensate in the molten state is brought into intimate contact with the vapor phase in a directly downstream mass transfer zone which is provided with baffles, and a vapor phase and a polycondensate are obtained, (c) the polycondensate is separated from the vapor phase and a polycondensate which can be granulated is discharged, with the proviso that the total residence time of the polycondensate in the molten state in stages (a), (b) and (c) does not exceed 30 minutes, and (d) diamines are obtained by distillation of the vapor phase separated off in stage (c) and are recycled to stage (a).

The novel process has the advantages that a copolyamide which can be granulated and which is particularly suitable for solid-phase postcondensation is obtained in a short time, that few terminal pyrrolidine groups are formed, eliminated diamines and any lactams are recovered and byproducts are discharged, and that crosslinking and hence gel formation are avoided and discoloration is reduced.

For the preparation of the novel copolyamides, from 5 to 80% by weight of a salt of 1,4-diaminobutane and an equimolar amount of a C$_4$–C$_{18}$-dicarboxylic acid are used as component A. Preferred dicarboxylic acids are alkanedicarboxylic acids of 6 to 12 carbon atoms, in particular straight-chain dicarboxylic acids having the stated number of carbon atoms, such as adipic acid, sebacic acid or dodecanedioic acid. Other preferred dicarboxylic acids are those which are derived from benzene, biphenyl or naphthalene and contain two non-adjacent carboxyl groups, such as terephthalic acid, isophthalic acid, naphthalene-1,6-dicarboxylic acid or 4,4,'-biphenyldicarboxylic acid. Adipic acid, terephthalic acid and isophthalic acid have become particularly important.

From 20 to 95% by weight of a lactam having a lactam ring of 6 to 12 carbon atoms is used as component B. Examples of suitable lactams are caprolactam, capryllactam or laurolactam. Caprolactam is particularly preferred. Other suitable components B are ω-aminocarboxylic acids of 6 to 12 carbon atoms, in particular ω-aminoalkanecarboxylic acids having the stated number of carbon atoms, such as ω-aminocaproic acid or ω-aminolauric acid, preferably ω-aminocaproic acid.

Instead of the stated lactams of aminocarboxylic acids, the stated amounts of a salt of a C$_4$–C$_{12}$-diamine and an equimolar amount of a C$_4$–C$_{18}$-dicarboxylic acid are used as component (B), with the proviso that dicarboxylic acids of components (A) and (B) are not identical Preferred diamines are C$_4$–C$_{12}$-alkanediamines, in particular straight-chain α,ω-alkanediamines having the stated number of carbon atoms, such as 1,4-diaminobutane, hexamethylenediamine, octamethylenediamine or decamethylenediamine. 1,4-Diaminobutane and hexamethylenediamine have become particularly important.

Preferred dicarboxylic acids are alkanedicarboxylic acids of 6 to 12 carbon atoms, in particular straight-chain alkanedicarboxylic acids having the stated number of carbon atoms, such as adipic acid, sebacic acid or dodecanedioic acid, as well as dicarboxylic acids which are derived from benzene, biphenyl or naphthalene, in particular those derived from benzene, such as terephthalic acid or isophthalic acid, 1,6-naphthalenedicarboxylic acid or 4,4,'-biphenyldicarboxylic acid. Adipic acid, terephthalic acid and isophthalic acid have become particularly important. The proviso is that the dicarboxylic acids of components A and B are not identical.

It is also possible to use mixtures of lactams, aminocarboxylic acids and salts of diamines and dicarboxylic acids as component B. Of course, the copolyamides produced have the composition corresponding to the components A and B.

The stated salts are as a rule prepared by mixing the starting materials in an equimolar ratio in aqueous solution. It is also possible initially to take diamines and to neutralize them with the dicarboxylic acid, or vice versa. As a rule, suitable solutions contain from 30 to 70, in particular from 40 to 65, % by weight of the stated salts. These salts generally have a pH of 7.2 at 20° C. Particularly advantageously, the stated salts are used as concentrated aqueous solutions. The solutions of starting materials A and B are advantageously mixed before being used and are at, for example, from 50 to 100° C., in particular from 80° to 100° C.

In stage (a), an aqueous solution of a mixture of components A and B and in addition from 0.5 to 20 mol %, based on the amount of 1,4-diaminobutane used, of diamines is passed through an evaporator zone with vaporization of water under from 1 to 10 bar at above the melting point of the copolyamide, and a vapor phase and a precondensate are obtained.

In stage (a), a temperature of from 260° to 330° C., in particular from 280° to 310° C., is advantageously maintained. Of course, the temperature is always chosen so that the precondensate produced is always in a molten state. A pressure of from 6 to 9 bar is preferably maintained. By sufficient heat transfer, it is ensured that the water is vaporized very rapidly and the reaction is initiated so that, at the end of the evaporator zone, a conversion of not less than 93%, in particular from 94 to 97%, is achieved. A residence time of from 60 to 120, in particular from 70 to 100, seconds is advantageously maintained in the evaporator zone. The diamines additionally used are advantageously those which are present in the starting salts used, 1,4-diaminobutane being particularly preferably added as the most readily volatile diamine.

The evaporator zone is advantageously tubular. In the industrial procedure, tube bundles are advantageously used. It has proven useful if the cross-section of the tubes is alternately cylindrical and slot-like. Another advantageous embodiment of the evaporator zone comprises the use of tubes or tube bundles in which the individual tubes are provided with baffles to create a large surface area. This is achieved, for example, by filling with packing, such as Raschig rings, metal rings or, in particular, wire mesh packing.

The precondensate in the molten state is brought into intimate contact with the vapor phase in a directly downstream mass transfer zone (stage b)) which is provided with baffles, and a vapor phase and a polycondensate are obtained. The vapor phase essentially consists of steam and small amounts of 1,4-diaminobutane and pyrrolidine and may contain a further diamine if a salt with another diamine or a lactam is used as component B.

In stage (b), a temperature of from 260° to 330° C., in particular from 280° to 320° C., and a pressure of from 1 to 10, in particular from 6 to 9, bar are advantageously maintained. Advantageously, the same pressure and temperature conditions as in stage (a) are chosen. A residence time of from 60 to 120, in particular from 70 to 100, seconds is advantageously maintained.

Like stage (a), stage (b) is advantageously tubular, in particular a tube bundle. The mass transfer zone is provided with baffles, for example packing such as Raschig rings, metal rings or, in particular, wire mesh packing. These baffles provide a large surface area by means of which the phases, i.e. precondensate and vapor, are brought into intimate contact. The result of this is that the amount of diamine and any lactam liberated with steam is considerably reduced. It has therefore proven useful if the surface area in the mass transfer zone is from 0.5 to 2 $m^2$ per liter.

The two-phase mixture emerging from the mass transfer zone (b) and consisting of vapor and polycondensate is separated in a separation zone c. As a rule, separation takes place automatically on the basis of physical differences, the polycondensate collected in the lower part of the separation zone being discharged as a polycondensate capable of being granulated. The vapors liberated are likewise discharged and, as stated above, essentially consist of steam and small amounts of diamine and pyrrolidine and possibly lactams.

The total residence time of the molten polymer in stages (a), (b) and (c) is not more than 30, advantageously from 2 to 30, in particular from 3 to 10, minutes. Advantageously, the temperatures and pressure conditions maintained in stage (c) are the same as those in stage (c).

The polycondensate thus obtained advantageously contains from 150 to 400, particularly advantageously from 250 to 300, meq/kg of terminal amino groups and has a relative viscosity of from 1.4 to 1.8.

Diamines are recovered by distillation of the vapor phase obtained in stage (c) and, after the addition of further diamine, e.g. 1,4-diaminobutane, are recycled to stage (a). The vapor phase is advantageously distilled in a column, for example having from 5 to 15 theoretical plates, from 0.1 to 0.5 l of water per kg of vapor advantageously being added at the top of the column and aqueous pyrrolidine being obtained as a top product and an aqueous solution of diamines as a bottom product. The latter are recycled to stage (a), once again after being supplemented by diamines. The amount of the diamines recycled to stage (a) is advantageously such that the abovementioned content of terminal amino groups is achieved in the discharged polycondensates.

The resulting polycondensate is advantageously further subjected to solid-phase condensation in the presence of an inert gas, such as nitrogen or steam, in particular superheated steam, for example at 200° to 270° C., below the melting point of the polycondensate until the desired final viscosity is reached. The polycondensate and inert gas are advantageously fed in by the countercurrent method. In order to obtain a high space-time yield and a high molecular weight, a polycondensate containing from 150 to 400, in particular from 250 to 300, meq/kg of terminal amino groups and having a relative viscosity of from 2 to 3 is advantageously used for the solid-phase condensation.

Conventional additives, such as glass fibers, mineral fillers, stabilizers, lubricants and flameproofing agents, are advantageously added to the molten polycondensate discharged from stage (c) and the mixture is compounded, after which the polycondensate is further subjected to solid-phase condensation.

Copolyamides obtainable by the process of the invention are suitable for the production of moldings by injection molding or extrusion and for the production of filaments and fibers.

The Examples which follow illustrate the process according to the invention.

EXAMPLES 1 TO 5

A concentrated solution (component A) at 94° C. is prepared from equimolar amounts of 1,4-diaminobutane and a dicarboxylic acid and mixed with a concentrated aqueous solution of a salt of diamines and dicarboxylic acids (component B) or caprolactam. The concentration depends on the solubility and is shown in Table 1. This solution is metered by means of a metering pump into a 3 m long vertical evaporator tube. The evaporator tube has a volume of 180 ml and consists of alternating cylindrical and slot-like sections. The heat exchange area is about 1400 cm². Water is rapidly vaporized at 308° C. by a fast-circulating liquid heating medium, and a precondensate is prepared under a pressure of 8 bar. The residence time in the evaporator is on average 85 seconds. The precondensate/vapor mixture which emerges from the evaporator is at 305° C. and is passed into the directly downstream mass transfer zone, which contains packing. The mass transfer zone has a surface area of 2 m² and is operated at the same temperature and under the same pressure as the evaporator. Intimate exchange between diamine-containing gas phases and condensing prepolymer takes place in the mass transfer zone. The residence time in this zone is on average 90 seconds. The vapor/polycondensate mixture emerging from the mass transfer zone is passed into a separating vessel, the vapor is separated off and the polycondensate is discharged. The total residence time in the molten state in the evaporator zone, the mass transfer zone and the separation zone is on average 4 minutes.

The vapors obtained (the composition is shown in Table 1) are passed at 300° C. into a column having 10 theoretical plates and are separated. 900 ml of water per hour are added at the top of the column to increase the separation effect. The temperature at the top of the column is about 175° C. The pyrrolidine formed is removed virtually quantitatively at the top of the column. The solution which contains amine and may contain lactam and runs off at the bottom of the column is recycled to the evaporator (stage a). The recycled diamine solution is supplemented with an additional amount of 1,4-diaminobutane.

The polycondensate thus obtained is further subjected to continuous solid-phase condensation by the counter-current method with superheated steam until the desired viscosity is obtained Details are given in Table 1 below.

TABLE 1

| Example | 1 | 2 | 3 | 4 | 5 |
|---|---|---|---|---|---|
| Components A + B | 46/4T | 66/4T | 66/4T | 6/4T | 66/4T |
| % by weight | 80:20 | 80:20 | 60:40 | 60:40 | 50:50 |
| Solids content of the starting solution (% by weight) | 50 | 60 | 50 | 50 | 40 |
| Feed (kg/h) | 7.0 | 7.0 | 7.1 | 7.3 | 5.0 |
| Addition of further 1,4-diaminobutane (g/h) | 160 | 80 | 100 | 80 | 80 |
| Polycondensate after stage c | | | | | |
| $\eta_{rel}$[1] | 1.54 | 1.49 | 1.63 | 1.55 | 1.57 |
| Terminal groups | | | | | |
| —COOH meq/kg | 74 | 67 | 80 | 123 | 64 |
| —NH₂ meq/kg | 179 | 443 | 508 | 148 | 210 |
| Gas phase composition from phase c | | | | | |
| Vapors before column: | | | | | |
| 1,4-diaminobutane (% by weight) | 9.0 | 4.0 | 6.0 | 3.0 | 7.0 |
| Caprolactam (% by weight) | | | | 2.8 | |
| Bottom products: | | | | | |
| 1,4-diaminobutane (% by weight) | 8.0 | 3.7 | 5.4 | 2.4 | 6.3 |
| Caprolactam (% by weight) | | | | 2.8 | |
| Vapors after column: | | | | | |
| Pyrrolidine (% by weight) | 0.85 | 0.3 | 0.6 | 0.6 | 0.7 |
| 1,4-diaminobutane (% by weight) | <0.05 | <0.01 | <0.01 | <0.01 | <0.05 |
| Caprolactam (% by weight) | | | | <0.01 | |
| End product of solid-phase postcondensation | | | | | |
| $\eta_{rel}$[1] | 2.15 | 2.84 | 2.5 | 1.84 | 2.08 |
| Terminal groups | | | | | |
| —COOH meq/kg | 10 | 12 | 26 | 55 | 21 |
| —NH₂ meq/kg | 50 | 167 | 121 | 108 | 93 |
| mp. (DSC) (°C.) | 278 | 231 | 243 | 220 | 255 |
| Heating conditions | | | | | |
| Time (h) | 35 | 48 | 36 | 48 | 30 |
| Temperature (°C.) | 260 | 220 | 235 | 210 | 240 |

[1]Measured at c = 0.5 g in 100 ml of 96% strength sulfuric acid
Explanations:
46 = Salt of 1,4-diaminobutane and adipic acid
4T = Salt of 1,4-diaminobutane and terephthalic acid
66 = Salt of hexamethylenediamine and adipic acid
6 = Caprolactam

We claim:
1. A process for the continuous preparation of a copolyamide which contains units of the formula —NH(CH₂)₄-NH- and is composed of
  (A) from 5 to 80% by weight of 1,4-diaminobutane and an equimolar amount of $C_4$–$C_{18}$-dicarboxylic acid and
  (B) from 20 to 95% by weight of a lactam having a lactam ring of 6 to 12 carbon atoms, an ω-aminocarboxylic acid of 6 to 12 carbon atoms or a $C_4$–$C_{12}$-diamine and an equimolar amount of a $C_4$–$C_{18}$-dicarboxylic acid, with the proviso that the dicarboxylic acids of components A, and B, are not identical,
wherein
  (a) an aqueous solution of a mixture of components A and B and in addition from 0.5 to 20 mol % based on the amount of 1,4-diaminobutane, of a diamine is passed through an evaporator zone with vaporization of water under from 1 to 10 bar at above the melting point of the copolyamide, and a vapor phase and a precondensate are obtained,
  (b) the precondensate in the molten state is brought into intimate contact with the vapor phase in a directly downstream mass transfer zone which is provided with baffles, and a vapor phase and a polycondensate are obtained,
  (c) the polycondensate is separated from the vapor phase and a polycondensate which can be granulated is discharged, with the proviso that the total residence time of the polycondensate in stages a, b and c does not exceed 30 minutes, and

(d) diamines are obtained by distillation of the vapor phase separated off in stage (c) and are recycled to stage (a).

2. A process as set forth in claim 1, wherein a pressure of from 6 to 9 bar is maintained in stages (a) and (b).

3. A process as set forth in claim 1, wherein a temperature of from 260° to 330° C. is maintained in stages (a) and (b).

4. A process as set forth in claim 1, wherein a residence time of from 60 to 120 seconds is maintained in stage (a).

5. A process as set forth in claim 1, wherein a residence time of from 60 to 120 seconds is maintained in stage (b).

6. A process as set forth in claim 1, wherein a total residence time of from 3 to 10 minutes is maintained in stages (a), (b) and (c).

7. A process as set forth in claim 1, wherein the polycondensate discharged from stage (c) has a content of terminal amino groups of 150 to 400 meq/kg 8. A process as set forth in claim 1, wherein the vapors separated off are distilled in a column, water is added at the top of the column and pyrrolidine is distilled off at the top, and the bottom product obtained is an aqueous diamine solution, which is recycled to stage (a).

9. A process as set forth in claim 1, wherein the polycondensate obtained in stage (c) is further subjected to solid-phase condensation in an inert gas atmosphere at from 200° to 270° C. but below the melting point of the polycondensate, and a high molecular weight polycondensate is obtained.

10. A process as set forth in claim 1, wherein additives are added to the molten polycondensate discharged from stage (c).

* * * * *